United States Patent [19]

Billet et al.

[11] Patent Number: 4,960,850
[45] Date of Patent: Oct. 2, 1990

[54] PRODUCTION OF DIORGANOPOLYSILOXANES HAVING SILANOL END GROUPS

[75] Inventors: Lucien Billet, Vernaison; Jean-Jacques Lebrun, Caluire, both of France

[73] Assignee: Rhone-Poulenc Chimie, Courbevoie, France

[21] Appl. No.: 182,462

[22] Filed: Apr. 18, 1988

[30] Foreign Application Priority Data

Apr. 16, 1987 [FR] France ............................... 87 05645

[51] Int. Cl.$^5$ ............................................. C08G 77/06
[52] U.S. Cl. ......................................... 528/23; 528/33
[58] Field of Search ................................. 528/23, 33

[56] References Cited

U.S. PATENT DOCUMENTS

| | | | |
|---|---|---|---|
| 3,078,255 | 2/1963 | Pike | 528/23 |
| 3,155,634 | 11/1964 | Pike | 528/33 |
| 4,431,771 | 2/1984 | Falender et al. | 524/863 |
| 4,448,927 | 5/1984 | Falender et al. | 524/860 |
| 4,482,670 | 11/1984 | Saam et al. | 524/860 |
| 4,563,513 | 1/1986 | Inomata | 528/14 |
| 4,722,987 | 2/1988 | Ikeno | 528/23 |

Primary Examiner—John C. Bleutge
Assistant Examiner—Ralph Dean, Jr.
Attorney, Agent, or Firm—Burns, Doane, Swecker & Mathis

[57] ABSTRACT

Polydiorganosiloxanes having silanol end groups, well suited for the production of vulcanizable silicone compositions, are conveniently prepared by bulk polycondensing a polydiorganosiloxane oligomer having silanol end groups in a closed reaction zone in the presence of a catalytically effective amount of trifluoromethylsulfonic acid, at a temperature of from 20° to 160° C., while continuously removing water of polycondensation, and terminating the polycondensation reaction by adding a catalyst neutralizing amount of a cyclopolydiorganosilazane or a polydiorganosilazane having diorganoaminosilyl end groups to the medium of reaction.

10 Claims, No Drawings

PRODUCTION OF DIORGANOPOLYSILOXANES HAVING SILANOL END GROUPS

BACKGROUND OF THE INVENTION

1. Field of the Invention

The present invention relates to the preparation of a polydiorganosiloxane having silanol end groups by a polycondensation reaction.

2. Description of the Prior Art:

It is well known to this art to polycondense silanols attached to silanes and/or diorganopolysiloxanes in the presence of miscellaneous compounds which accelerate the polycondensation by serving as dehydrating agents or catalysts (compare the text by Walter Noll, *Chemistry and Technology of Silicones*, 1968 English language edition, Academic Press, pages 209 to 218).

It is also known, from U.S. Pat. No. 2,961,245, to carry out bulk polymerization by ring-opening of cyclotrisiloxanes containing fluorinated hydrocarbon radicals (1), in the presence of a perfluoroalkane sulfonic acid (3) and a polydiorganosiloxane having triorganosiloxy end groups (2) (principally hexamethyldisiloxane) as chain-blocking agent.

A fluorinated silicone oil is thereby obtained after devolatilization, the viscosity of which is mainly regulated by the ratio of the siloxane (2) to the siloxane (1), the catalyst (3) optionally being removed by distillation or washing.

U.S. Pat. No. 3,308,203 describes the polycondensation, in an organic solvent, of a mixture of linear and branched chain polyorganosiloxanes bearing silanol groups, in the presence of a catalyst which can be, inter alia, a perfluoroalkanesulfonic acid or p-toluene sulfonic acid. The solvent must be removed from the reaction mixture and, in cases where p-toluene sulfonic acid is used (Example 4), it is deactivated by adding LiOH and the salt formed is removed by filtration.

British Patent No. 1 325,654 describes the polymerization, in the presence of a perfluoroalkane sulfonic acid and silica, of cyclic polysiloxanes optionally mixed with chain-blocking linear diorganopolysiloxanes. Upon completion of the reaction, the catalyst can be neutralized with hexamethyldisilazane.

U.S. Pat. No. 4,448,927 describes the polymerization, in the presence of a filler material (silica or carbon black), of linear siloxane oligomers $HO(R_2SiO)_nH$ and/or cyclic siloxane oligomers $(R_2SiO)_y$ capable of containing, in addition, chain-blocking polydiorganosiloxanes. In Example 3, the polymerization is described of polydiorganopolysiloxane having silanol end groups in the presence of a filler and trifluoromethanesulfonic acid, deactivated upon completion of the reaction with MgO.

Similar processes of polymerization on filler material are also described in European Patents EP-A No. 119,816 and EP-A No. 119,817.

Finally, in European Patent EP-A No. 133,975, the polycondensation is described, in solvent medium, of polydiorganosiloxanes containing linear and branched silanol groups, using a catalytic system consisting of a free acid including, in particular, a perfluoroalkanesulfonic acid, and its amine salt.

SUMMARY OF THE INVENTION

Accordingly, a major object of the present invention is the provision of an improved process for preparing polydiorganosiloxanes having silanol end groups, by polycondensation of a polydiorganosiloxane having silanol end groups which is substantially free from volatile polysiloxane products, such volatile products consisting essentially, in addition to the inherent formation of water, of cyclosiloxanes and/or polydiorganosiloxanes of low molecular weight.

Another object of this invention is the provision of an improved process of the above type, according to which the desired degree of polymerization can be precisely adjusted without requiring an additional stage such as filtration or devolatilization for the purpose of removing the catalyst in an active or deactivated form.

Another object of the present invention is the provision of an improved process of the above type which, beginning with readily available raw materials, enables the production of polydiorganosiloxanes having silanol end groups and possessing a wide diversity of viscosities, ranging from oils to gums, said process being carried out in the presence of very small amounts of catalyst.

Yet another object of the present invention is the provision of an improved process of the above type which entails only polycondensation reactions, without spurious cyclization and chain-fission reactions producing linear or cyclic volatile polydiorganosiloxane which would have to be removed by devolatilization.

Briefly, the present invention features a process for preparing polydiorganosiloxanes having silanol end groups, comprising the bulk polycondensation of polydiorganosiloxane oligomers having silanol end groups, in a closed chamber, in the presence of a catalytically effective amount of trifluoromethanesulfonic acid and at a temperature of from 20 to 160° C., preferably from 50° to 130° C. The water formed during the reaction is continuously removed, and the polycondensation reaction is terminated by adding a suitable amount of a polydiorganosilazane selected from among the cyclopolydiorganosilazanes and polydiorganosilazanes having diorganoaminosilyl end groups, to neutralize the catalyst.

Herein, all parts and percentages are given by weight, unless otherwise indicated.

DETAILED DESCRIPTION OF THE PREFERRED EMBODIMENTS OF THE INVENTION

More particularly according to the present invention, the starting material polydiorganosiloxane oligomers are well known raw materials in the silicone industry, and originate from the hydrolysis of diorganodichlorosilane, typically dimethyldichlorosilane.

During this hydrolysis reaction, a mixture of linear and cyclic oligomers is produced, the relative proportions of which depend on the conditions of the hydrolysis.

According to the process of the invention, linear oligomers substantially free from cyclic oligomers are used as starting materials, the cyclic oligomers having therefore been removed beforehand by any suitable means, for example by distillation.

The fact that the starting materials are substantially devoid of volatile cyclosiloxanes permits the direct production of polymer having the desired viscosity, without the need for devolatilization, since trifluoromethanesulfonic acid, under the specific conditions of the present invention, promotes polycondensation reactions only, and does not catalyze cyclization and fission reactions of the siloxane groupings (the content of catalyst and the polycondensation temperature).

Moreover, since the reaction is carried out in bulk, it is not necessary to remove any solvent upon completion of the reaction.

The polydiorganosiloxane oligomers having silanol end groups have the general formula:

$$HO(R_2SiO)_nH \qquad (1)$$

in which R is a hydrogen atom or a methyl, ethyl, propyl, phenyl, vinyl, allyl or 3,3,3-trifluoropropyl radical and n is an integer of from 3 to 300, inclusive, preferably from 10 to 100, or, alternatively, n is selected such that the oligomer has a viscosity of from 50 to 150 mPa.s at 25° C. when R is methyl.

Advantageously, in the industrial base products, as stated above, R is a methyl radical and the linear oligomers of formula (1) at the end of the hydrolysis stage possess a viscosity generally ranging from 50 to 150 mPa.s at 25° C., which corresponds to the formula (1) with R=methyl and n ranging from about 3 t o 100 silicon atoms.

To terminate the polycondensation reaction, it suffices, according to the invention, to add to the reaction medium a suitable amount of linear or cyclic polydiorganosilazane, sufficient to neutralize the amount of trifluoromethanesulfonic acid initially introduced.

The cyclopolydiorganosilazane corresponds to the general formula:

$$R_2Si\,NH)_m \qquad (2)$$

in which the radicals R, which may be identical or different, are as defined in the formula (1) above and m is an integer ranging from 3 to 10 inclusive.

Cyclopolydiorganosilazanes are well known polymers, a process for preparation of which entails the ammonolysis of a diorganodichlorosilane. This process is described, in particular, in British Patent No. 881,178. Other processes are also described, or noted at pages 349 to 352, of the abovementioned text by Walter Noll.

Because of ready availability and ease of use, it is preferable to use cyclopolydiorganosilazanes that are liquid at room temperature, especially those for which m is 3 or 5, and R is methyl, namely, cyclotri(dimethyl)silazane, also known as hexamethylcyclotrisilazane, and cyclopenta(dimethyl)disilazane, also known as decamethylcyclopentasilazane. Silazanes that are in the solid state at room temperature (20° C.) may also be used, dissolved in an organic solvent.

The polydiorganosilazanes having diorganoaminosilyl end groups correspond to the general formula:

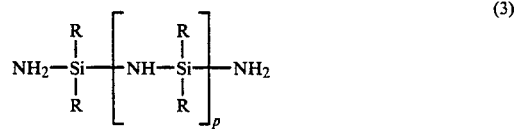

(3)

in which the radicals R, which may be identical or different, are as defined in the formula (1) above and p is an integer of from 1 to 100.

The polysilazanes of formula (3) are known polymers which may be prepared, in particular, by ring-opening and polymerization of cyclopolydiorganosilazanes of the formula (2). Other processes are also described, or noted at page 351, of the abovementioned text by Walter Noll.

It is preferable to use the polydiorganosilazanes of formula (3) that are liquid at room temperature (20° C.). Polydiorganosilazanes that are solid at room temperature may also be used, dissolved in an organic solvent.

It has surprisingly been discovered according to the invention that the polydiorganosilazane of formulae (2) or (3) above instantaneously neutralize trifluoromethanesulfonic acid, thereby immediately terminating the polycondensation reaction and enabling the silanol end groups of the polydiorganosiloxane formed to be preserved intact. A result of this kind cannot be obtained with linear polysilazanes having triorganic silyl end groups, such as hexamethyldisilazane, which admittedly neutralizes the trifluoromethanesulfonic acid, but which also serves as a blocking agent, substituting a part of the silanol end groups of the formed polydiorganosiloxane by trimethylsiloxy end groups.

Moreover, and this represents one of the major advantages of the use of polydiorganosilazanes of formulae (2) or (3), the deactivated catalyst can remain within the formed polymer without any kind of drawback being imparted thereto.

The polycondensation reaction is carried out in a closed chamber, which is preferably a reactor containing a lid and openings which can be stoppered. Moreover, the reactor is equipped with a stirrer connected to an apparatus which enables the viscosity of the reaction mixture to be continuously measured. The reactor contains a sensor for the pressure prevailing in the atmosphere of the closed chamber situated above the reaction mixture.

The reactor is equipped with means for heating and with a syringe for injection of the catalyst and of the polydiorganosilazane.

The reactor is also equipped with means that make it possible to establish a purge of a dry inert gas, generally nitrogen, and/or means that make it possible to establish a reduced pressure in the atmosphere of the closed chamber, for the purpose of removing volatile products and especially water.

The polycondensation reaction can advantageously be carried out in the following manner:

The oligomer is introduced into the reactor and degassed, where appropriate, in the heated state (70° to 200° C.) under a reduced pressure, generally ranging from 0.133 to 10 kPa, for a period of time which depends on the quality of the vacuum. This time can be 30 minutes under a pressure of 3 kPa. This devolatilization enables the water present in the starting oligomer to be removed.

The oligomers, dried where appropriate, are maintained under stirring and at a temperature of 20°-160° C., and preferably 50°-130° C., and from 5 to 300, and preferably from 10 to 100, parts by weight of trifluoromethanesulfonic acid per million parts of oligomers are added, while the water formed by the polycondensation is continuously removed. This removal of water can be carried out by any suitable means, as described above, in particular by flushing with a dry inert gas (nitrogen), by establishing a reduced pressure in the chamber by suction or by a combination of these means.

During the polycondensation stage, the temperature is maintained at from 20° to 160° C., preferably from 50° to 130° C. If the reaction is carried out at a temperature below room temperature (20° C.), the kinetics of the polycondensation reaction are too slow. On the other hand, if the reaction is carried out at a temperature above approximately 160° C., volatile cyclic oligomers are formed. As soon as the reaction mass reaches the desired viscosity, the polycondensation is stopped instantaneously by adding a sufficient amount of polydiorganosilazanes to neutralize the catalyst. In general, from 0.5 to 50 parts of polydiorganosilazanes per part of catalyst initially introduced, and preferably from 1 to 10 parts, are used.

The polymer obtained contains substantially no volatile cyclopolysiloxanes (in general less than 2%) and possesses polymer chain ends having silanol groups.

The oils or gums formed may be used directly for incorporation, for example, in cold- or hot-curing silicone elastomer compositions.

In order to further illustrate the present invention and the advantages thereof, the following specific examples are given, it being understood that same are intended only as illustrative and in nowise limitative.

EXAMPLE 1

300 g of a polydimethylsiloxane oligomer having silanol end groups and possessing a viscosity of 100 mPa.s at 25° C., containing 1.7% of volatile products, were introduced into a 500 cm³ reactor equipped with means for heating (double wall), means for producing a vacuum, a stirrer connected to a device permitting instantaneous measurement of the viscosity of the reaction mixture, a syringe for introduction of liquid and means permitting covering or flushing with nitrogen.

The reaction mixture was maintained for 20 minutes under a reduced pressure of 2.7 kPa under stirring (120 revolutions per minute).

The vacuum was then broken (returned to atmospheric pressure) under a blanket (atmosphere) of nitrogen, and the temperature was raised at 110° C. 4.4 μl of trifluoromethanesulfonic acid (equivalent to 25 ppm) of purity greater than 98% were introduced. A reduced pressure of 2.7 kPa and stirring (120 revolutions per minute) were immediately reestablished. The viscosity increased instantaneously. 10 minutes after the introduction of the catalyst, the measured viscosity of the reaction mixture was 200,000 mPa.s at 25° C. The reaction was terminated by adding 50 mg of hexamethylcyclotrisilazane.

The deactivation was instantaneous, since the polymer obtained had, indeed, a viscosity of 205,000 mPa.s at 25° C. and a proportion of volatile products of 1.8% by weight, assayed by microdevolatilization. The microdevolatilization consisted of introducing 2 g of polymer into an aluminum dish which was adjusted to 175° C. for 2 hours under a reduced pressure of 0.06 kPa. After being cooled, the dish was weighed, thereby enabling the losses, and hence the volatile products, to be assessed.

The content of silanol groups in the polymer, determined by infrared, was 335 ppm (parts per million).

EXAMPLE 2

The procedure of Example 1 was repeated exactly, except that the temperature of the reaction mixture was 80° C. After 25 minutes of polycondensation, an oil having a viscosity of 60,000 mPa.s at 25° C., a proportion of volatile products of 1.5% and a content of silanol groups of 650 ppm, was obtained.

EXAMPLES 3 TO 5

The procedure of Example 1 was repeated exactly, except that the polycondensation time was varied.

The results obtained are reported in the following Table:

TABLE

| Example | Time (minutes) | Viscosity mPa.s at 25° C. | Volatile products % |
| --- | --- | --- | --- |
| 3 | 8 | 126,000 | 1.76 |
| 4 | 9 | 158,000 | 1.73 |
| 5 | 25 | gum | — |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a polydiorganosiloxane having silanol end groups, comprising bulk polycondensing a polydiorganosiloxane oligomer having silanol end groups in a closed reaction zone in the presence of a catalytically effective amount of trifluoromethylsulfonic acid, at a temperature of from 20° to 160° C., while continuously removing water of polycondensation, and terminating the polycondensation reaction by adding a catalyst neutralizing amount of a cyclopolydiorganosilazane or a polydiorganosilazane having diorganoaminosilyl end groups to the medium of reaction, said cyclopolydiorganosilazane or polydiorganosilazane enabling the silanol end groups of the polydiorganosiloxane formed to be preserved intact.

2. The process as defined by claim 1, said polydiorganosiloxane final product having silanol end groups containing less than 2% by weight of volatile cyclopolysiloxanes.

3. The process as defined by claim 1, carried out in the presence of from 5 to 300 parts by weight of trifluoromethanesulfonic acid per million parts of oligomer reactant, and at a polycondensation temperature of from 50° to 130° C.

4. The process as defined by claim 1, comprising continuously removing the water of polycondensation by flushing the reaction zone with an inert gas, establishing a reduced pressure in the reaction zone, or a combination thereof.

5. The process as defined by claim 1, comprising adding from 0.5 to 50 parts by weight of polydiorganopolysilazanes per part of trifluoromethanesulfonic acid.

6. The process as defined by claim 1, said reactant oligomer having been devolatilized and having the general formula:

$$HO(R_2 SiO)_n H \qquad (1)$$

in which R is methyl, ethyl, propyl, phenyl, vinyl, allyl or 3,3,3-trifluoropropyl radicals and n is an integer ranging from 3 to 100.

7. The process as defined by claim 6, wherein said formula (1) R is methyl and n is such that the oligomer has a viscosity of from 50 to 150 mPa.s at 25° C.

8. The process as defined by claim 1, comprising adding a cyclopolydiorganosilazane having the general formula:

 (2)

in which the radicals R, which may be identical or different, are each a methyl, ethyl, propyl, phenyl, vinyl, allyl or 3,3,3-trifluoropropyl radical and m is an integer ranging from 3 to 10.

9. The process as defined by claim 8, said compound of formula (2) comprising hexamethylcyclotrisilazane or decamethylcyclopentasilazane.

10. The process as defined by claim 1, comprising adding a polydiorganosilazane having diorganoaminosilyl end groups which has the general formula:

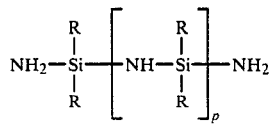 (3)

in which the radicals R, which may be identical or different, are each a methyl, ethyl, propyl, phenyl, vinyl, allyl or 3,3,3-trifluoropropyl radical and p is an integer ranging from 1 to 100.

* * * * *